United States Patent Office 2,911,373
Patented Nov. 3, 1959

2,911,373

CATION EXCHANGE MATERIALS AND THEIR PREPARATION

Mayer B. Goren, Marion W. Pickell, and Leo Garwin, Oklahoma City, Okla., assignors to Kerr-McGee Oil Industries Inc., a corporation of Delaware No Drawing. Application February 10, 1956
Serial No. 564,644

6 Claims. (Cl. 252—179)

This invention relates to carbonaceous cation exchange materials having improved properties and to the preparation of such materials. More particularly, this invention is concerned with the preparation of carbonaceous cation exchange materials that have high exchange capacities.

This application is a continuation-in-part of application Serial No. 370,216, filed July 24, 1953, now abandoned.

The characteristics that are desirable in a satisfactory cation exchange material which is to be used for softening or deionizing water containing dissolved contaminants may be summarized as follows:

(1) High exchange capacity per unit volume or weight of the material.

(2) Physical stability; i.e., resistance toward attrition and fining during use. The particles should be mechanically fairly hard and have good resistance toward crushing as determined empirically by a "feel" test or more accurately through controlled attrition tests in a suitable apparatus such as a ball mill.

(3) Freedom from color throw-off, odor and taste; i.e., the material should be relatively insoluble and show a minimum tendency to dissolve in water with which it is in contact.

(4) It should not show an excessive adsorptive capacity for the regenerant; i.e., washing out of the excess of acid or salt used in regenerating the cation exchange material should be quickly and easily achieved so that large quantities of wash water are not needed.

The preparation of carbonaceous cation exchange materials has been described in a number of patents and publications. These materials are generally prepared by treatment of a carbonaceous material such as bituminous coal, peat, lignite, etc., with a sulfonating agent such as concentrated sulfuric acid, oleum or gaseous sulfur trioxide to effect sulfonation and thereby introduce on a relatively insoluble lattice, reactive groups that are capable of undergoing exchange reactions with cations in solution. Such sulfonated products possess the above-enumerated desirable properties to varying degrees.

By the term "asphaltic bituminous material" as used hereinafter in the specification and claims is meant semi-solid to solid pyrogenous and naturally occurring asphalts (bitumens and pyrobitumens), one or more semi-solid to solid fractions or components thereof, or semi-solid to solid products obtained by blowing these materials or one or more of their components or fractions with air or an oxygen containing gas in the presence or absence of catalysts. Examples of such naturally occurring materials include gilsonite, grahamite, wurtzilite, albertite, elaterite and native asphalts, such as Trinidad asphalt; while examples of pyrogenous materials include propane asphalt, vacuum reduced crudes, cracked tars, etc. Blown asphaltic bituminous materials include those blown with air or an oxygen containing gas either in the presence or absence of catalysts such as phosphorous pentoxide, ferric chloride, cobaltic salts, etc. By the term "components" or "fractions" of pyrogenous and naturally occurring asphalts is meant asphaltenes, resin and oil mixtures, and separate resin and oil fractions. These may be obtained, for example, by the method as described in copending application Serial No. 218,480, filed March 30, 1951, now U.S. Patent No. 2,783,188. Where the term "oil fraction" appears in the specification and claims, it is understood that the oil fraction is not used or claimed per se but has been blown or treated with a suitable chemical agent before the sulfonation step for the purpose of rendering it semi-solid to solid. The use of chemical treating agents such as aluminum chloride, boron fluoride, and chlorinated materials for this purpose is fully described in U.S. Patent No. 2,247,375.

These asphaltic bituminous materials are fusible on heating to elevated temperatures and possess solubility, hardness at normal ambient temperatures, and reaction characteristics which make them desirable as starting materials for the preparation of cation exchange materials. A further advantage to be offered in the processing of such asphaltic bituminous materials as compared with the processing of coals or related bituminous substances is that no loss of fines occurs in the grinding of the asphaltic bituminous material prior to sulfonation since the fines may be melted, cast and reground. This would be reflected in a lower cost of production and therefore a lower cost for the product.

The sulfonation of asphaltenes for the production of ion exchange materials has been mentioned in French Patent 831,912 of 1938. This patent does not give a specific example of the sulfonation of asphaltenes although it does illustrate the sulfonation of a petroleum pitch (M.P. 230° F.) with 100% sulfuric acid in the presence of sodium dichromate. This product is said to have a capacity of 46 grams calcium ion per kilogram. Upon applying this method of sulfonation to asphaltenes, it has been found that the resultant product exhibits an exchange capacity of ten grams of calcium ion per kilogram of product. Twelve grams of the sample on regeneration with 50 milliliters (ml.) of 0.4 normal hydrochloric acid deionizes 750 ml. of hard water containing 400 p.p.m. hardness calculated as calcium carbonate. From this, it is apparent that although mention is made by this French patent of asphaltene sulfonation for producing cation exchange materials, the sulfonated asphaltenes resulting from the only sulfonation method taught by this patent are unsatisfactory. A clue to the reason for statements made in this patent relative to sulfonated asphaltenes is apparent upon considering the prohibitive wash requirement of the product. Thus, the product after washing to neutrality, conversion to the sodium cycle by treatment with sodium chloride, and regeneration with an appropriate quantity of acid, required washing with 870 ml. of distilled water before the effluent was neutral to Congo red indicator. Therefore, if the product is not washed completely, it would appear to be of very high capacity. Furthermore, the product shows a considerable amount of color throw-off in both the acid and sodium cycle, presumably owing to oxidative degradations incurred in the sulfonation reaction.

Other known methods of sulfonating carbonaceous materials such as wood, lignite, peat, bituminous coal, etc., include, for example, sulfonation with concentrated sulfuric acid at elevated temperature, sulfonation with concentrated sulfuric acid at elevated temperature followed by resulfonation with sulfur trioxide, sulfonation with oleum, and a variety of other methods. When these sulfonation methods are applied to asphaltenes, gilsonite, blown asphalt and other asphaltic bituminous materials, the products obtained are generally unsatisfactory as ion exchange materials owing to their low exchange capacity and prohibitive washing requirements to remove excess regenerant. Thus, for example, the sulfonation of pentane-precipitated asphaltenes from a vacuum-reduced crude with concentrated sulfuric acid at 212° F. yields a product, 12 grams of which, when regenerated with 50 ml. of 0.4 N hydrochloric acid required about a liter of wash water to remove excess regenerant. Furthermore, the washed, acid-free product deionized only 500 ml. of hard water containing 400 p.p.m. hardness calculated as calcium carbonate. The rate of exchange obtained is very slow and thus, a long contact between the material and hard water is necessary.

Accordingly, it is a principal object of the present invention to provide a sulfonated asphaltic bituminous material of high exchange capacity, good physical stability, excellent washing characteristics and improved color throw-off characteristics.

It is a further object of the present invention to provide a process for producing sulfonated asphaltic bituminous materials of the aforesaid characteristics.

These and other objects will become more apparent from the following description of the present invention.

We have discovered that if a finely divided solid non-asphaltic substance or a mixture of finely divided solid non-asphaltic substances which are substantially inert to the sulfonating agent under the conditions of the process of the invention is uniformly incorporated in an asphaltic bituminous material prior to sulfonation, the resultant product is of exceptionally high exchange capacity, possesses good physical stability, has excellent washing characteristics, and possesses exceptionally low color throw-off characteristics.

The amounts of finely divided solid non-asphaltic substance incorporated in the asphaltic bituminous substance should be at least 2% for obtaining substantial improvement but should not exceed 40% by weight of the asphaltic bituminous material. The preferred amount of solid non-asphaltic substance incorporated is within the range 15 to 25% by weight, 20% being the preferred amount.

In order to obtain uniform incorporation of these finely divided solid non-asphaltic substances in the asphaltic bituminous material, the latter should be melted and the former introduced into the same and homogeneously distributed throughout by agitation. The resulting molten mass containing solid non-asphaltic substance homogeneously incorporated throughout the asphaltic bituminous material may then be solidified by cooling to a suitable temperature, crushed and classified to the desired mesh size which preferably is within the range of 20 to 40 mesh.

After homogeneous distribution of the solid non-asphaltic substance in the asphaltic bituminous material, sulfonation may be carried out by any one of a number of ways. Methods of sulfonation include, for example, sulfonation with concentrated sulfuric acid at an elevated temperature in the neighborhood of 212° F., sulfonation in accordance with the method described in copending application Serial No. 342,728, filed March 16, 1953, now U.S. Patent No. 2,748,057, sulfonation with concentrated sulfuric acid followed by resulfonation with sulfur trioxide gas, etc. The foregoing sulfonating agents are sometimes referred to as $SO_3$ sulfonating agents.

By the term "solid non-asphaltic substance" as used hereinafter in the specification and claims is meant a solid substance, inorganic or carbonaceous in nature, which is not within the defined term "asphaltic bituminous material," and which is infusible at temperatures below about 350–500° F., substantially inert to moderate sulfonation conditions, relatively insoluble in molten asphaltic bituminous material, and capable of being subdivided to yield finely divided particles. Examples of inorganic solid non-asphaltic substances include naturally occurring materials such as talc, clays and asbestos; and salts such as sodium sulfate, magnesium sulfate, etc.

Such inorganic solid non-asphaltic substances are inert to $SO_3$ sulfonating agents under the conditions taught in this invention and are preferred over carbonaceous solid non-asphaltic substances. The suitable solid non-asphaltic substances which are carbonaceous in nature are solid carbonaceous materials of limited reactivity with $SO_3$ sulfonating agents under the conditions taught in the invention, and which retain the essential properties of a suitable solid non-asphaltic substance as above defined under the conditions taught in the invention; or those solid carbonaceous materials substantially inert to $SO_3$ sulfonating agents under the conditions taught in the invention due to prior sulfonation, or other reason. Examples of carbonaceous solid non-asphaltic substances not previously sulfonated but having limited reactivity with $SO_3$ sulfonating agents under the conditions taught in this invention and when incorporated with asphaltic bituminous material include materials such as finely divided coal, peat, lignite, and carbon black. Examples of previously sulfonated carbonaceous solid non-asphaltic substances include sulfonated blown asphalt or blown asphaltic fractions, sulfonated asphaltenes, sulfonated natural hard asphalts, sulfonated bituminous coal, sulfonated crosslinked polystyrene, and sulfonated phenol-aldehyde polymers.

The foregoing solid non-asphaltic substances are preferably milled materials in finely divided form, the preferred particle size being about 1 to 100 microns in one dimension. It is understood that many solid non-asphaltic substances are fibrous in nature and thus in some instances at least a second dimension of the particle may be substantially greater than 1 to 100 microns. When these finely divided insoluble and infusible (under the conditions of the invention) particles of solid non-asphaltic substance are incorporated homogeneously with asphaltic bituminous material, they tend to reinforce and strengthen the carbonaceous ion exchange material.

Apparently the prohibitive washing requirements to remove excess regenerant and the low exchange capacity of sulfonated asphaltic bituminous materials which do not include a solid non-asphaltic substance as do the products of the present invention is attributable to limited permeability of the individual sulfonated particles toward water or other ionic species with which the particles are in contact. Thus, the difficulty in washing out occluded regenerant and the slow rate of ion exchange can be attributed to this limited permeability to water in the first instance, and to water containing ions in the latter instance. Furthermore, the overall ion exchange capacity, even for relatively long contact periods is low and this is apparently the result of the fact that the sulfonating agent attacks only the outer surface of the particles of asphaltic bituminous materials with a resultant low degree of sulfonation of the entire particles. However, when operating in accordance with the present invention as described above, the degree of sulfonation during reaction and the permeability of the product to water and to aqueous solutions containing ions are enhanced.

The following examples are illustrative of the present invention but are not limiting to the scope thereof which is set forth in the appended claims.

Example 1

A vacuum-reduced asphalt of 89 penetration and softening point (ring and ball) of 120° F. was treated with ten volumes of pentane, and the precipitated asphaltenes were filtered, dried, brought to fusion by heating and allowed to solidify. This product was then ground and screened to obtain a 20 to 40 mesh material.

One hundred parts of the above 20 to 40 mesh asphaltenes were treated with 540 parts of 66° Bé. sulfuric acid in a vessel suitably equipped with a stirring device and vented for the escape of gases formed in the reaction. Heat was applied slowly to the reaction mass to bring it to a tempertaure of approximately 212° F., which was maintained for two hours. After cooling, the product was drained of excess acid and then carefully washed free of acid. The product of this reaction is shiny, hard and granular.

Twelve grams of this material was placed in a glass column, exhausted by treatment with sodium hydroxide solution, well washed and regenerated with dilute hydrochloric acid. Hard water containing 400 p.p.m. hardness, calculated as $CaCO_3$, was then passed through until the acidity of the effluent indicated a leakage of 20 p.p.m. hardness through the column. The column was then washed, regenerated as before, and treated with hard water again. This process was repeated a number of times to obtain a constant value of exchange capacity. In all instances, almost a liter of water was required to wash out the regenerating acid, and on an average the material in the column deionized about 550 ml. of the hard water, at which point leakage reached the limit defined above. Thus, the product had an exchange capacity of about 0.36 milliequivalent per gram (meq./g.).

*Example II*

A finely divided commercial asbestine was treated in aqueous suspension with sufficient hydrochloric acid to neutralize the alkaline earth carbonates, whereupon the carbonate-free acicular product was then washed free of excess acid and dried.

Five hundred parts of asphaltenes prepared as outlined in Example I was melted and to the molten mass was added 50 parts of the dried carbonate-free asbestine, under vigorous agitation that served to disperse the inert material uniformly. The melt was then poured out on a clean surface to solidify and the cooled product was ground and screened to a 20 to 40 mesh size. Oversize material was reground, while fines were remelted, cast and ground again.

One hundred parts of the 20 to 40 mesh material was then treated with 540 parts of concentrated sulfuric acid and the mixture was stirred and slowly heated to about 212° F. at which temperature the reaction was allowed to proceed for about two hours. After cooling, the product was thoroughly washed with water, converted to the sodium cycle by treatment with salt and washing was continued with hot water and finally with steam.

Twelve grams of dry material prepared in this manner was then regenerated several times with dilute hydrochloric acid and tested for its exchange capacity using the procedure described in Example I. The volume of rinse water required to wash out excess regenerant was reduced by a factor of five (to less than 200 ml.) and the volume of hard water deionized was 800 ml. Thus, this product had an activity of approximately 0.52 meq./g., an increase of 50% in activity.

*Example III*

A sample of gilsonite having a softening point of 325–330° F. and containing mineral matter was obtained from commercial sources. A portion of this sample was treated with excess benzene to remove the gilsonite, thus leaving the mineral matter content behind as a benzene insoluble residue. The sample was found to contain 2–5% by weight mineral matter. About 1/2–1% of the mineral matter passed a 325 mesh screen and the remaining mineral matter contained particles about 200 to 100 mesh in size with a large portion of such material consisting of sand and hard ore-like particles.

The remainder of the gilsonite sample was crushed and screened to obtain a 20 to 40 mesh material. One hundred parts of this material was sulfonated by treatment with 540 parts of 66° Bé. sulfuric acid at 212° F. for two hours and the product was thoroughly washed and dried. In column operation as described in the previous examples, the sulfonated gilsonite exhibited very poor exchange characteristics, a very slow rate of flow being required to effect exchange. The volume of hard water deionized by twelve grams was 750 ml. which indicates a working capacity of about 0.46 meq./g. Furthermore, the material adsorbed the excess regenerant so strongly that excessive volumes of water were needed to wash it free of acid.

*Example IV*

Five hundred parts of gilsonite as used in Example III was melted and to the molten mixture was added 60 parts of a finely pulverized sample of commercial sulfonated coal. The melt was well stirred to disperse the solid material uniformly, whereupon the mixture was solidified, ground and sieved to obtain a 20 to 40 mesh material.

Forty parts of this material was then sulfonated and washed as described in the previous examples. In column operation, twelve grams of the product deionized 1200 ml. of the standard hard water at a rapid rate of flow and the volume of wash water required to elute the excess regenerant was 190 ml. Thus the product had a working capacity 60% greater than that of the sulfonated gilsonite of Example III.

*Example V*

Two hundred grams of the asphaltene-asbestine mixture prepared according to Example II was melted and to the molten mass was added 25 g. of finely pulverized anhydrous sodium sulfate. The uniformly mixed product was cast, solidified, ground and screened to 20 to 40 mesh size. Forty parts of the screened material was then sulfonated as in previous examples. Twelve grams of the product was evaluated in column operation for capacity and washing characteristics. Thus it was found that after regeneration from the sodium cycle with 50 ml. of 0.4 N HCl, the excess regenerant was easily eluted with 115 ml. of water and the acid-free product deionized 850–900 ml. of the standard hard water. Thus, it had a working capacity of approximately 0.57 meq./g.

*Example VI*

A vacuum reduced asphalt having a softening point of 113° F. and penetration of 92 was treated with 10 volumes of liquid propane at ambient temperature in a rotating pressure vessel for two hours. The propane-insoluble heavy phase was collected and freed of solvent. To increase the hardness of the product it was air blown at 530° F. for 19 hours to afford material having a softening point of 303° F. and penetration of 2. This product was chilled, ground and screened to a mesh size between 20 and 40 and sulfonated in the manner described in Example I. Evaluation for ion exchange characteristics showed that 12 grams of the material after regeneration from a sodium cycle with dilute hydrochloric acid required over a liter of wash water for removal of excess regenerant and deionized 600 ml. of the standard hard water.

*Example VII*

Fines obtained in the manufacture of a commercial sulfonated cross-lined polystyrene cation exchange resin were uniformly ground to pass 200 mesh. Eight hundred parts of the blown bitumen obtained in Example VI were heated to fusion and two hundred parts of the finely ground sulfonated polystyrene was incorporated into the melt by thorough stirring. The melt was then cast, cooled and pulverized, material of 20/40 mesh size being chosen for sulfonation. Fines were remelted, cast and reground so that no loss of material is involved.

One hundred grams of the 20/40 mesh material was treated with 300 ml. of 95% sulfuric acid at steam bath temperature for two hours. After cooling, the product was thoroughly washed, converted to the sodium form by neutralization with sodium hydroxide solution and then washed with steam and hot water.

Twelve grams of the dried product was regenerated with dilute hydrochloric acid and tested for its exchange characteristics using the technique previously described.

The volume of rinse water required to wash out excess regenerant was reduced to 90 ml., and the volume of hard water deionized was 1250 ml. The activity of this product was therefore twice that of the material obtained in Example VI.

*Example VIII*

Twenty parts of a commercial carbon black ("Philblack E") was incorporated into 100 parts of molten asphaltenes such as were used in Example I. 20/40 mesh material was obtained, sulfonated and purified in the same fashion as outlined in Example I. It was found that 180–200 ml. of water were required to wash out excess regenerant (a five-fold reduction) and the product (12 grams) deionized 750 ml. of the hard water.

*Example IX*

A vacuum-reduced asphalt of 37 penetration and 117° F. ring and ball softening point was oxidized by blowing with a current of air for 15 hours at 500° F. The product of this oxidation had a softening point of 271° F., penetration of 6 and penetration index of +5. This blown asphalt was chilled, crushed and screened and the 10 to 30 mesh material was retained. 100 grams of the sized material was contacted with 300 ml. of 95% sulfuric acid, allowed to stand overnight, and then heated to 212–230° F. for two hours. After cooling, the excess acid was recovered by filtration and the residue of sulfonated product was washed completely free of acid. Evaluation for exchange characteristics in column operation showed that 12 grams of the material after regeneration from a sodium cycle with dilute hydrochloric acid required over a liter of wash water for removal of excess regenerant and deionized 800 ml. of the standard hard water.

*Example X*

An Oklahoma bituminous coal was ground in a ball mill to pass a 200 mesh screen. Fifteen parts of the fine coal was well stirred into 85 parts of molten blown asphalt described in Example IX, the product cast, ground and screened and the 10 to 30 mesh material chosen for sulfonation. Twenty grams of this material was sulfonated and washed as in the previous example. Regenerated and tested under identical conditions, 12 grams of the regenerated material was washed free of acid with 210 ml. of water and deionized 1050 ml. of the standard hard water.

*Example XI*

85 parts of oxidized propane-insoluble resin such as described in Example VI was heated well above its softening point and fifteen parts of 200 mesh fuller's earth, which had been fired at 1472° F. was uniformly stirred into the melt. After solidification, grinding and screening 20/40 mesh material was sulfonated as in the previous examples. In column operation, 12 grams of the product required washing with 170 ml. of water to remove excess regenerant, and the material in the acid form deionized 850 ml. of the standard hard water.

What is claimed is:

1. A process for preparing a cation exchange material which comprises incorporating 2–40% by weight of solid inorganic substance having a particle size of about 1–100 microns uniformly throughout a mass of molten asphaltic bituminous material, solidifying the resulting mass of molten asphaltic bituminous material, subdividing the solidified mass of asphaltic bituminous material to produce particles having a size of 20–40 mesh with the inorganic substance uniformly distributed therethrough, and sulfonating the particles of asphaltic bituminous material having a size of 20–40 mesh with an $SO_3$ sulfonating agent to produce a cation exchange material, the inorganic substance being infusible at temperatures below about 350° F. and at the temperature of the sulfonation step, inert to the sulfonating agent and insoluble in the asphaltic bituminous material.

2. The cation exchange material prepared by the process of claim 1.

3. The process of claim 1 wherein the asphaltic bituminous material contains about 20% by weight of solid inorganic substance.

4. A process for preparing a cation exchange material which comprises incorporating 2–40% by weight of solid inorganic substance having a particle size of about 1–100 microns uniformly throughout a mass of molten asphaltenes, solidifying the resulting mass of molten asphaltenes, subdividing the solidified mass of asphaltenes to produce particles having a size of 20–40 mesh with the inorganic substance uniformly distributed therethrough, and sulfonating the particles of asphaltenes having a size of 20–40 mesh with an $SO_3$ sulfonating agent to produce a cation exchange material, the inorganic substance being infusible at temperatures below about 350° F. and at the temperature of the sulfonation step, inert to the sulfonating agent and insoluble in the asphaltenes.

5. The cation exchange material prepared by the process of claim 4.

6. The process of claim 4 wherein the asphaltenes contain about 20% by weight of solid inorganic substance.

References Cited in the file of this patent

UNITED STATES PATENTS

| Number | Name | Date |
|---|---|---|
| 565,675 | Dumble | Aug. 11, 1896 |
| 1,869,083 | Willard | July 26, 1932 |
| 2,191,060 | Liebknecht | Feb. 20, 1940 |
| 2,191,063 | Smit | Feb. 20, 1940 |
| 2,208,171 | Urbain | July 16, 1940 |
| 2,309,365 | Urbain | Jan. 26, 1943 |
| 2,375,117 | Lentz | May 1, 1945 |
| 2,378,307 | Liebknecht | June 12, 1945 |
| 2,409,437 | LaCrosse | Oct. 15, 1946 |
| 2,465,960 | Berge | Mar. 29, 1949 |
| 2,718,505 | Baker et al. | Sept. 20, 1955 |
| 2,739,951 | Wilkinson | Mar. 27, 1956 |
| 2,748,057 | Goren | May 29, 1956 |